United States Patent [19]

Edwards et al.

[11] Patent Number: 4,588,780
[45] Date of Patent: May 13, 1986

[54] FIBRE CONTAINING POLYMERS AND PROCESS FOR PRODUCTION THEREOF

[75] Inventors: Douglas C. Edwards; James A. Crossman, both of Sarnia, Canada

[73] Assignee: Polysar Limited, Sarnia, Canada

[21] Appl. No.: 735,294

[22] Filed: May 17, 1985

Related U.S. Application Data

[63] Continuation of Ser. No. 578,503, Feb. 9, 1984, abandoned.

[51] Int. Cl.$^4$ .................. C08L 77/10; C08L 9/08; C08L 9/04
[52] U.S. Cl. .................. 525/184; 260/998.15; 524/514; 525/183
[58] Field of Search .................. 525/184, 183; 260/998.15; 524/388, 514

[56] References Cited

U.S. PATENT DOCUMENTS

| | | | |
|---|---|---|---|
| 2,683,697 | 7/1954 | Newell et al. | 525/184 |
| 2,715,066 | 8/1955 | Felgley | 260/998.15 |
| 3,117,944 | 1/1964 | Harrell | 524/388 |
| 3,969,568 | 7/1976 | Sperley | 525/184 |
| 4,263,184 | 4/1981 | Leo et al. | 525/935 |

*Primary Examiner*—Lewis T. Jacobs
*Assistant Examiner*—A. Carrillo
*Attorney, Agent, or Firm*—Stevens, Davis, Miller & Mosher

[57] ABSTRACT

A process is provided for the production of mixtures of polymer and fibrous materials by co-coagulation of the polymer and fibrous material. Mixtures of the polymer and fibrous material and vulcanizates of these mixtures are also described.

19 Claims, No Drawings

FIBRE CONTAINING POLYMERS AND PROCESS FOR PRODUCTION THEREOF

This application is a continuation of application Ser. No. 578,503 filed Feb. 9, 1984, now abandoned.

FIELD OF THE INVENTION

The present invention is directed to a process of producing mixtures of polymers and fibrous materials, to the products of said process and to the vulcanizates obtained from such products.

DESCRIPTION OF THE PRIOR ART

A great variety of materials are known in the art for use as fillers and/or reinforcing materials for plastics and for rubbers. Fillers are normally considered to be largely non-reinforcing and are usually selected from the particulate inorganic compounds. Reinforcing materials are usually selected from the particulate carbon blacks and certain particulate inorganic compounds. Fibrous materials frequently are added to rubber compounds to improve various properties in rubbers and to reduce the extent of fabric reinforcement and suitable such fibres include asbestos, cellulose fibres, glass fibres, cotton and various synthetic organic fibres such as polyester and rayon. The fibre may be used as short fibres, for example chopped fibres, or as longer fibres. An important facet of the use of such fibres is the incorporation of the fibres into the polymer matrix.

It is well known that carbon black may be incorporated into polymers by mixing, particularly as a suspension in water, with a polymer in latex form and coagulating the mixture, see for example U.S. Pat. Nos. 1,991,367, 2,419,512 and 2,441,090. U.S. Pat. No. 4,263,184 discloses a homogeneous predispersed fibre composition prepared by mixing a latex of a polymer with fibrous material to form a wetted fibre mixture and a coagulant is mixed with the wetted fibre mixture to form the predispersed fibre composition.

SUMMARY OF THE INVENTION

The present invention is directed to a process for the production of mixtures of polymer and fibrous materials, said process comprising the steps of providing an agitated aqueous solution of coagulant for the polymer, adding an aqueous suspension of said fibrous material to the coagulant solution, adding said polymer in aqueous latex form to said coagulant solution and co-coagulating said polymer and fibrous material, and recovering and drying the mixture of polymer and fibrous material.

The invention is further directed to a process for the production of mixtures of polymer and fibrous materials, said process comprising the steps of providing an agitated aqueous solution of coagulant for the polymer, adding an aqueous suspension of said fibrous material to the coagulant solution, adding said polymer in aqueous latex form to said coagulant solution and co-coagulating said polymer and fibrous material, and recovering and drying the mixture of polymer and fibrous material, said fibrous material being a polymeric paraphenylene terephthalamide aramid having an average length of from about 1 to about 5 mm and a BET surface area of greater than 1 $m^2/g$.

The invention is further directed to polymerfibrous material mixtures produced by the process comprising the steps of providing an agitated aqueous solution of coagulant for the polymer, adding an aqueous suspension of said fibrous material to the coagulant solution, adding said polymer in aqueous latex form to said coagulant solution and co-coagulating said polymer and fibrous material, and recovering and drying the mixture of polymer and fibrous material.

The invention is further directed to polymerfibrous material mixtures produced by the process comprising the steps of providing an agitated aqueous solution of coagulant for the polymer, adding an aqueous suspension of said fibrous material to the coagulant solution, adding said polymer in aqueous latex form to said coagulation solution and co-coagulating said polymer and fibrous material, and recovering and drying the mixture of polymer and fibrous material, said fibrous material being a polymeric paraphenylene terephthalamide aramid having an average length of from about 1 to about 5 mm and a BET surface area of greater than 1 $m^2/g$.

The invention is further directed to vulcanizates produced from the mixture of polymer and fibrous material produced by the process comprising the steps of providing an agitated aqueous solution of coagulant for the polymer, adding an aqueous suspension of said fibrous material to the coagulant solution, adding said polymer in aqueous latex form to said coagulant solution and co-coagulating said polymer and fibrous material, and recovering and drying the mixture of polymer and fibrous material, by the steps comprising mixing said mixture of polymer and fibrous material with rubber compounding ingredients and vulcanization active agents, shaping the so-formed mixture and vulcanizing the shaped mixture by heating at an elevated temperature.

The invention is further directed to vulcanizates produced from the mixture of polymer and fibrous material produced by the process comprising the steps of providing an agitated aqueous solution of coagulant for the polymer, adding an aqueous suspension of said fibrous material to the coagulant solution, adding said polymer in aqueous latex form to said coagulation solution and co-coagulating said polymer and fibrous material, and recovering and drying the mixture of polymer and fibrous material, said fibrous material being a polymeric paraphenylene terephthalamide aramid having an average length of from about 1 to about 5 mm and a BET surface area of greater than 1 $m^2/g$, by the steps comprising mixing said mixture of polymer and fibrous material with rubber compounding ingredients and vulcanization active agents, shaping the so-formed mixture and vulcanizing the shaped mixture by heating at an elevated temperature.

The invention is further directed to vulcanizates produced from the mixture of polymer and fibrous material produced by the process comprising the steps of providing an agitated aqueous solution of coagulant for the polymer, adding an aqueous supension of said fibrous material to the coagulant solution, adding said polymer in aqueous latex form to said coagulant solution and co-coagulating said polymer and said fibrous material, and recovering and drying the mixture of polymer and fibrous material, said fibrous material being a polymeric paraphenylene terephthalamide aramid having an average length of from about 1 to about 5 mm and a BET surface area of greater than 1 $m^2/g$, by the steps comprising mixing said mixture of polymer and fibrous material with one or more compatible polymers, with rubber compounding ingredients and vulcanization active agents, shaping the so-formed mixture and vulcanizing the shaped mixture by heating at an elevated temperature.

DESCRIPTION OF THE PREFERRED EMBODIMENTS

The polymers which may be used in this invention are selected from natural rubber in latex form and the synthetic rubbery polymers normally produced by emulsion polymerization and available in the latex form such as styrene-butadiene polymers, butadiene-acrylonitrile polymers, carboxylated styrene-butadiene polymers, carboxylated butadiene-acrylonitrile polymers, polymers comprising chloroprene, polymers comprising acrylic monomers in latex form, and other synthetic rubbery polymers in latex form such as butyl rubber, halogenated butyl rubber, polybutadiene and ethylene-propylene-non-conjugated diene polymers. Preferred among these polymers are styrene-butadiene polymers in which the average styrene content of tne polymer is from about 15 to about 40 percent by weight, mixtures of two or more styrene-butadiene polymers in which the average styrene content is from about 45 to about 60 percent by weight, carboxylated styrene-butadiene polymers in which the styrene content is from about 15 to about 40 percent by weight and the bound carboxylic acid monomer content is from about 2 to about 10 percent by weight, butadiene-acrylonitrile polymers in which the acrylonitrile content is from about 20 to about 50 percent by weight, carboxylated butadiene-acrylonitrile polymers in which the acrylonitrile content is from about 25 to about 40 percent by weight and the bound carboxylic acid monomer content is from about 2 to about 10 percent by weight and polymers comprising chloroprene. Such preferred polymers may also contain compatible extender oil or plasticizer, such as hydrocarbon oils for the styrene-butadiene polymers and alkyl esters for the butadiene-acrylonitrile polymers and polymers comprising chloroprene.

The fibrous material which may be used in this invention includes cellulose fibres such as cellulose, modified cellulose, cotton, jute, wood pulp and sisal, the mineral fibres such as asbestos and mineral wool, synthetic inorganic fibres such as glass fibres and glass yarn and synthetic fibres such as rayon, nylon, polyester, polypropylene and aramid fibres. Preferred fibrous materials include fibres that are fibrilated especially such as to contain numerous fine diameter fibrils attached to the main fibre. An especially preferred fibrous material is the aramid fibre which is polymeric paraphenylene terephthalamide known as KEVLAR ® having a surface area greater than 1 $m^2/g$. The preferred KEVLAR in the form known as wet pulp has a fibre length of from about 1 to about 5 mm, preferably from about 2 to about 4 mm, has a BET surface area of from about 7 to about 12 $m^2/g$ and contains from about 40 to about 60 weight percent of water. Examples of wet pulp have been described by duPont as merge #6F104 and #F205 and as having Canadian Standard Freeness, respectively, of 450 to 575 and 300 to 425. Such fibrous material may be mixed with water and readily forms very thick suspensions of high viscosity even at concentrations of only about 2 weight percent in water. If the fibrous material is dried to remove the residual water associated with the wet pulp, it has been found that it is impossible to form a uniform mixture (using any of the conventional polymer mixing equipment) of the fibrous material with any of the polymers described above under conditions regarded as practical by those skilled in the art. The fibres do not disperse evenly in the polymer and occur as agglomerations of fibre within a polymer matrix.

The coagulants used in the process of this invention are those well known in the art for the coagulation of the polymers from the latex. Suitable coagulants include the aqueous solutions of calcium chloride, sulphuric acid, sulphuric acid plus sodium chloride, sulphuric acid plus sodium chloride plus a polyamine compound as exemplified in Canadian Pat. No. 979,595, sulphuric acid plus polyamine compound, alum, alum plus sulphuric acid, polyaluminum chloride also known as aluminum polyhydroxychloride, magnesium sulphate and the like. Selection of a suitable coagulant for use to coagulate any particular polymer from the latex is readily known to one of average skill in the art. For example, to coagulate a styrene-butadiene polymer from the latex, one may use sulphuric acid, sulphuric acid plus salt, sulphuric acid plus salt plus polyamine compound or polyaluminum chloride, to coagulate a butadiene-acrylonitrile polymer from the latex, one may use calcium chloride or polyaluminum chloride and to coagulate polymers comprising chloroprene from the latex, one may use the polyvalent inorganic salts including calcium salts and alum.

The process of the present invention requires that the polymer latex be added to an agitated aqueous solution of the coagulant which also contains fibrous material suspended in the coagulant solution. The aqueous solution of the coagulant which also contains fibrous material suspended therein is prepared by adding the fibre to the coagulant solution, preferably to produce a dilute dispersion containing not more than about 1 weight percent of fibre in the coagulant solution, and to subject the dispersion of fibre in coagulant solution to agitation for a short period of time to improve the separation from one anotner of the fibres before the polymer is added. Such agitation may be accomplished by any known means especially such as to achieve preferably a high degree of shearing action and would be for a period of time of from a few seconds, such as 2 or 3 seconds, up to not more than about 30 to 40 seconds. The polymer latex is then added to the dispersion of fibre in coagulant solution while the dispersion is being subjected to simple agitation. The fibrous material may be present in the coagulant solution as the total amount of fibre to be used or may be added as a dispersion in coagulant solution to the coagulation mixture continuously or intermittently as the latex is being added to the coagulant solution. Thus, for a batch type coagulation, it may be preferable to add all the fibrous material to the coagulant solution before the polymer latex is added, whereas for a continuous type coagulation it may be preferable to add a dispersion of the fibrous material in coagulant solution continuously or intermittently to the coagulation mixture while the latex is being added provided that part of the fibrous material is present in the coagulant solution before the addition of latex is initiated.

The coagulation will generally be undertaken with the coagulant solution maintained at a temperature of from about 25° to about 80° C., preferably from about 40° to about 70° C. The coagulant solution will be continuously agitated in order to mix all the components together. For a continuous process, coagulant solution will generally be continuously added to the coagulation mixture at a rate sufficient to provide the required coagulation action and the co-coagulated polymer-fibrous material mixture will generally be removed continuously, such as by overflow from the vessel as a suspension in the aqueous phase of coagulated polymer-fibre particles.

The concentration of fibrous material in the mixture of polymer and fibrous material is from about 0.25 to about 100 parts by weight of fibrous material per 100 parts by weight of polymer. In one preferred embodiment, the concentration of fibrous material is from about 0.25 to about 20, most preferably from about 2 to about 12, parts by weight per 100 parts by weight of polymer. In a second preferred embodiment, the concentration of fibrous material is from about 25 to about 100 parts by weight per 100 parts by weight of polymer. The polymer latex will usually have a polymer content of from about 10 to about 45 weight percent of polymer based on the latex, preferably from about 15 to about 30 weight percent of polymer. The coagulant solution will contain the normal concentrations of coagulants, that is from about 0.5 up to about 8 weight per cent, and acid concentrations, when used, will be such as to provide a pH of from about 2 to about 5. All flows of the various streams will be established to provide the required relative concentrations of components. The fibrous material is mixed with and suspended in water, which suspension is added to some or all of the aqueous coagulant solution. The concentration of fibrous material in the suspension in water is not important—it may range from about 0.1 up to about 5 percent by weight provided that it is still a pumpable suspension. The concentration of fibrous material in the coagulant solution will generally be from about 0.1 to about 0.5 percent by weight.

The co-coagulation product, that is the mixture of polymer and fibrous material, is separated from the aqueous phase such as by mechanical separation means or by filtration, may be washed with water, is recovered and the wet particles of polymer-fibrous material mixture are dried, such as in a hot air drier or in a dewatering-drying means.

The mixture of polymer and fibrous material may be used in many of the end-uses normal for the polymer itself—such as various automotive products, tires, mechanical goods and the like as applicable for the particular type of polymer. For example, a KEVLAR wet pulp-styrene-butadiene mixture may be used in various aspects of tire construction including, but not limited to, in the apex (which is the area above the bead wire sometimes referred to as filler or bead filler), as a carcass protecting layer under the tread and sidewall, as a sidewall component to improve cut and snag resistance and in the undertread (sometimes called the base) to provide improved cut resistance especially for on/off road use in agricultural and such tires. The mixture of polymer and fibrous material may also be used in mixtures with one or more compatible polymers. Thus, for example, the mixture of polymer and fibrous material may be mixed with polymers not containing fibre to produce a final mixture containing a lesser content of fibrous material per one hundred parts of total polymers. To illustrate, a mixture of styrene-butadiene polymer and fibrous material may be mixed with a styrene-butadiene polymer containing no fibre and compounded in the usual manner, or a mixture of a polymer comprising chloroprene and fibrous material may be mixed with a polymer comprising chloroprene and containing no fibre and compounded in the usual manner, or a mixture of a butadiene-acrylonitrile polymer and fibrous material may be mixed with polyvinyl chloride containing no fibre and then compounded in the usual way, or a mixture of styrene-butadiene polymer and fibrous material may be mixed with one of or both of polybutadiene and natural rubber containing no fibre and compounded in the usual manner. In all such uses, the polymer-fibrous material mixture will be compounded in the usual way with rubber compounding ingredients, such as fillers, extenders or plasticizers, antioxidants or antiozonants and the like, and with vulcanization active agents using rubber mills or internal mixers. The compounded mixtures will be shaped and then vulcanized by maintaining at an elevated temperature for a period of time, such as by heating to about 140° to about 250° C. for times of from about 5 minutes to about 2 hours.

Vulcanizates containing the polymer-fibrous material mixture of the invention possess improved properties when compared to vulcanizates of the same polymer containing no fibre. Such improved properties may include one or more of improved dimensional stability, increased modulus at low or moderate degrees of deformation and substantially increased resistance to tearing.

The following Examples illustrate the scope of the invention. All parts are parts by weight unless expressly shown otherwise. Tests used to evaluate the vulcanizate properties are ASTM tests adapted particularly for use with small samples of material. The fibrous material was used as provided and contained about 53 weight percent of water.

EXAMPLE 1

A styrene-butadiene polymer (about 24 weight percent of styrene) in latex form (about 22 percent solids) and an aramid fibre KEVLAR ® supplied as Wet Pulp having an average length of about 4 mm, merge number 6F104, Canadian Standard Freeness 450 to 575 and BET surface area of about 10 $m^2/g$ and supplied as a solid material containing about 53 percent of water, were used. The aramid fibre, as supplied, was added to water and subjected to vigorous agitation for about 5 minutes to provide a suspension of fibres in water with few, if any, agglomerations of fibre.

In Experiment #1, the fibre was suspended in water, mixed with the latex and the mixture maintained under agitation. A 1 percent solution of calcium chloride in water was slowly added to the mixture. This caused the formation of an agglomeration of at least part of the polymer and fibre which could not be adequately recovered. This experiment was a control. In Experiment #2, the latex was diluted with water (no fibre was added) and then added to a stirred 1% solution of calcium chloride—this led to the formation of an agglomeration of at least part of the polymer which could not be adequately recovered. This experiment was a control. In Experiment #3, the fibre was suspended in water and then mixed with 120 ml of 1% calcium chloride solution. The latex was added to the stirred mixture of fibre and calcium chloride which led to the formation of small particles of polymer and fibre which was readily recovered, washed with water and dried. Examination of the polymer-fibre mixture under a microscope showed it to be a uniform mixture of the components without significant agglomerations of fibre within the polymer. The details are provided in Table I.

TABLE I

| Experiment # | | 1 | 2 | 3 |
|---|---|---|---|---|
| Weight of fibre | g | 2.8 | — | 2.8 |
| Volume of water | ml | 200 | 300 | 300 |
| Volume of latex | ml | 200 | 200 | 200 |

TABLE I-continued

| Experiment # | | 1 | 2 | 3 |
|---|---|---|---|---|
| Volume of calcium chloride solution | ml | — | 120 | 120 |

EXAMPLE 2

Using the materials described in Example 1, a further batch co-coagulation was conducted similar to Experiment #3 thereof. 2.8 g of fibre was suspended in 300 ml of water which was then mixed with 120 ml of 1% calcium chloride solution. 200 ml of latex was slowly added to the stirred mixture of fibre and calcium chloride. The nature of the coagulating mixture was observed during the course of the latex addition and it was found that the polymer from the latex appeared to coagulate about the fibres, following which the polymer appeared to coagulate onto the surface of the so-formed particles.

EXAMPLE 3

Continuous co-coagulations were undertaken using the latex and fibre of Example 1. A coagulation vessel was provided and equipped with an agitator and containing coagulant. A vessel was provided and equipped with an air-driven stirrer and an outlet flow control means to dispense controlled amounts of the fibre-water suspension to the coagulation vessel. A vessel equipped with an outlet flow control capable of providing a controlled flow of latex per unit time was used to supply latex to the coagulation vessel. For Experiments #4 and #5, the coagulant was a mixture of 900 ml of a 4% solution of sodium chloride in water and 75 ml of a coagulant solution which contained 443 g of sodium chloride and 17.6 g of concentrated sulphuric acid in 3540 g of distilled water. For Experiment #6, the coagulant was a solution containing 0.25 weight percent of calcium chloride dissolved in distilled water. The fibre in water suspension contained for Experiment #4 1.4 g of fibre in 280 ml of water and was added in 9 ml aliquots over 13 minutes, for Experiment #5 1.4 g of fibre in 280 ml of water and was added in 9 ml aliquots over 6.5 minutes, and for Experiment #6 1.4 g of fibre in 280 ml of 0.2 weight percent calcium chloride solution and was added in 9 ml aliquots over 13.5 minutes. For all the experiments, the first aliquot of fibre in water was added before the latex was added to the coagulation vessel. The latex was added to the coagulation vessel over 14.5 minutes for Experiment #4, 7.15 minutes for Experiment #5 and 15 minutes for Experiment #6. For Experiment #7, the procedure of Experiment #4 was followed except that 2.15 ml of a naphthenic oil (ASTM D 2226, Type 103) was also added at the same time as the latex to the coagulation vessel over a time for both oil and latex of 15.25 minutes.

All coagulations produced small crumbs of coagulated polymer and fibre which were readily separated from the aqueous phase, washed and hot air dried to yield uniform mixtures containing essentially no agglomerations of fibre.

EXAMPLE 4

Following the procedure of Example 2, further co-coagulations were undertaken to provide samples of polymer containing varying amounts of fibre. The fibre was added to a 1% solution of calcium chloride in water and the latex was added thereto with continuous agitation over a period of about 30 minutes. For the Experiment #8, where no fibre was used, the coagulant was 2 g of calcium chloride dissolved in 400 ml of water. The coagulated polymers were recovered and hot air dried, yielding uniform dispersions of fibre in polymer. Portions of the polymer-fibre mixture were compounded, shaped into sheets, dumbbells cut for green strength measurements, the remaining sheets were vulcanized at 160° C. for 10 minutes and dumbbells cut for vulcanizate property measurement. The compounding recipe (based on 100 parts by weight of polymer) was 50 parts of carbon black, 3 parts of naphthenic oil, 3 parts of zinc oxide, 1.5 parts of stearic acid, 0.5 parts of N-(1,3-dimethylbutyl)-N'-phenyl-p-phenylene diamine, 0.5 parts of N,N'-bis(1,4-dimethylpentyl)-p-phenylene diamine, 0.3 parts of diphenylguanidine, 1.2 parts of N-tert.butyl-2-benzothiazole sulphenamide and 2 parts of sulphur. Further details are in Table II where for the green strength and vulcanizate properties W means with the grain and A means against the grain. The increase in green strength with increasing fibre content is readily seen. The increase in 100% modulus and trouser tear for the vulcanizates is readily seen.

TABLE II

| Experiment # | 8 | 9 | 10 | 11 | 12 | 13 | 14 | 15 |
|---|---|---|---|---|---|---|---|---|
| Water (ml) | 400 | 300 | 300 | 300 | 400 | 400 | 450 | 500 |
| Calcium chloride (ml) | (2 g) | 120 | 120 | 120 | 120 | 120 | 120 | 150 |
| Fibre (g) | — | 2.8 | 5.6 | 8.4 | 11.2 | 14 | 16.8 | 19.6 |
| Latex (ml) | 200 | 200 | 200 | 200 | 200 | 200 | 200 | 200 |
| Fibre content of polymer-fibre mixture phr | 0 | 3 | 6 | 9 | 12 | 15 | 18 | 21 |
| Compound Green Strength | | | | | | | | |
| Max. Stress (W) MPa | 0.5 | 0.85 | 1.6 | 1.8 | 2.35 | 3.3 | 3.1 | 2.6 |
| (A) MPa | 0.5 | 0.6 | 0.7 | 0.8 | 1.0 | 1.1 | 0.8 | 0.8 |
| Elongation (W) MPa | 415 | 170 | 145 | 95 | 80 | 70 | 80 | 80 |
| (A) MPa | 370 | 180 | 200 | 140 | 70 | 80 | 90 | 90 |
| Vulcanizate Properties | | | | | | | | |
| 100% Modulus (W) MPa | 2.4 | 6.4 | 9.0 | 11.1 | 13.7 | 147 | — | — |
| (A) MPa | 2.1 | 2.6 | 3.4 | 5.1 | 5.6 | 5.3 | 6.3 | 6.5 |
| 300% Modulus (W) MPa | 14.3 | 15.3 | 16.0 | 13.5 | 17.0 | — | — | — |
| (A) MPa | 13.9 | 13.1 | 12.7 | 12.9 | 13.2 | 12.4 | — | 12.2 |
| Tensile Strength (W) MPa | 29.9 | 26.3 | 23.5 | 21.2 | 18.4 | 14.9 | 15.4 | 18.6 |
| (A) MPa | 24.8 | 22.7 | 18.1 | 18.7 | 16.2 | 12.9 | 12.1 | 12.3 |
| Elongation (W) % | 490 | 430 | 410 | 390 | 320 | 110 | 50 | 40 |
| (A) % | 410 | 440 | 380 | 390 | 350 | 310 | 290 | 300 |
| Tensile Set (W) % | 20 | 15 | 23 | 30 | 29 | 7 | 2 | 1 |
| (A) % | 12 | 16 | 17 | 24 | 19 | 17 | 18 | 20 |
| Trouser Tear (W) kN/m | 12.6 | 25.9 | 47.5 | 55.8 | 48.2 | 32.4 | 37.1 | 25.2 |

TABLE II-continued

| Experiment # | 8 | 9 | 10 | 11 | 12 | 13 | 14 | 15 |
|---|---|---|---|---|---|---|---|---|
| (A) kN/m | 14.9 | 23.2 | 39.7 | 59.0 | 54.3 | 54.6 | 44.3 | 48.5 |

EXAMPLE 5

Samples of polymer-fibre mixtures from Experiments #10–15 of Example 4 were mixed with further polymer of the same type used in Experiment #8 to provide final mixtures all containing 3 parts of fibre per hundred parts of polymer. This was done in duplicate using two different procedures. In the first procedure, the polymer-fibre mixture was banded on a two roll mill and the polymer slowly added, banded again, ¾ cuts were made, 4 endwise passes were made and the product was finally sheeted off the mill. In the second procedure, the polymer-fibre mixture and the polymer were both added to a two roll mill, banded, ¾ cuts made, 4 endwise passes were made and the product was finally sheeted off the mill.

Examination of the final products showed them all to be uniform mixtures containing a few small agglomerations of fibres.

EXAMPLE 6

Latex samples of different polymers were co-coagulated with fibre. The procedure used was that described in Example 3. For Experiment #16, the polymer was a butadiene-acrylonitrile polymer (about 34 weight percent of acrylonitrile) in the latex form (about 26% solids), 100 ml of which was added to the coagulation vessel at a uniform rate over 14.6 minutes. The coagulation vessel contained 1 litre of 0.3 weight percent solution in water of calcium chloride and was initially at 62° C., the temperature falling to 52° C. at the end of the co-coagulation. The fibre (1.7 g) was suspended in 330 ml of water and was added in 10 ml portions over 13.5 minutes. The product was a small particle size crumb, was separated from the aqueous phase, washed and then dried in a hot air drier. Experiment #17 was a control, wherein the latex was similarly coagulated except that no fibre was added. The products of Experiments #16 and 17 were compounded (100 parts of polymer) with 50 parts of carbon black, 5 parts of di-octyl phthalate, 3 parts of zinc oxide, 1 part of stearic acid, 1.75 parts of sulphur, 1.5 parts of benzothiazyl disulphide and 0.5 parts of tetramethyl thiuram disulphide. Vulcanization was 4 minutes at 160° C. For Experiment #18, the polymer was a styrene-butadiene polymer containing about 58 weight percent of styrene in the latex form (about 27.3% solids), 100 ml of which was added to the coagulation vessel at a uniform rate over 14.6 minutes. The coagulation vessel contained 900 ml of a 4% solution of sodium chloride in water and 75 ml of the coagulant solution described in Example 3, and was at a temperature of about 55° to 50° C. The fibre (1.75 g) was suspended in 350 ml of water and was added in 10 ml aliquots over 13 minutes. The product was a small particle size crumb which was separated from the aqueous phase, washed and then dried. Experiment #19 was a control, wherein the latex was similarly coagulated except that no fibre was added. The products of Experiments #18 and 19 were compounded (70 parts of polymer) with 30 parts of styrene-butadiene polymer (about 23.5% of styrene), 30 parts of silica, 1 part of octylated diphenylamine, 5 parts of zinc oxide, 2 parts of diethylene glycol, 1 part of stearic acid, 1.5 parts of benzothiazyl disulphide, 0.3 parts of tetramethyl thiuram disulphide and 2.5 parts of sulphur. Vulcanization was for 10 minutes at 160° C. For Experiment #20, the polymer was a carboxylated butadiene-acrylonitrile polymer containing about 29% of acrylonitrile and about 7% of carboxylic acid in the latex form (about 26.1% solids), 100 ml of which was added to the coagulation vessel at a uniform rate over 15 minutes. The coagulation vessel contained 1000 ml of a 6% solution of sodium chloride, sufficient sulphuric acid was added to maintain the pH at 2.5 and was at a temperature of about 50° C. The fibre (1.66 g) was suspended in 320 ml of water also containing 18 g of sodium chloride and was added in 10 ml aliquots over 14 minutes. The product was separated from the aqueous phase, washed with water and then dried. Experiment #21 was a control, wherein the latex was similarly coagulated except that no fibre was added. The products of Experiments #20 and 21 were compounded (95 parts of polymer) with 50 parts of carbon black, 1 part of stearic acid, 1.5 parts of tetramethyl thiuram disulphide, 1.5 parts of sulphur and 10 parts of a 50/50 masterbatch of butadiene-acrylonitrile polymer and zinc oxide. Vulcanization was for 9.5 minutes at 160° C. The results are shown in Table III.

TABLE III

| Experiment # | 16 | 17 | 18 | 19 | 20 | 21 |
|---|---|---|---|---|---|---|
| Fibre content of polymer-fibre mixture phr | 3 | 0 | 3 | 0 | 3 | 0 |
| Compound Green Strength | | | | | | |
| Max. Stress (W) MPa | 1.9 | — | 5.6 | 3.5 | 5.1 | 1.3 |
| (A) MPa | 0.8 | 0.5 | 3.4 | 3.4 | 1.3 | 1.1 |
| Elongation (W) MPa | 110 | — | 65 | 90 | 150 | >1500 |
| (A) MPa | 285 | 565 | 75 | 80 | >1500 | >1500 |
| Vulcanizate Properties | | | | | | |
| 100% Modulus (W) MPa | 8.9 | 3.2 | 10.7 | 7.6 | 13.9 | 10.7 |
| (A) MPa | 7.3 | 3.2 | 7.9 | 7.1 | 7.1 | 8.3 |
| 300% Modulus (W) MPa | 16.1 | 16.1 | — | 14.5 | 23.1 | 26.9 |
| (A) MPa | 16.1 | 15.9 | 14.2 | 13.7 | 21.3 | 25.4 |
| Tensile Strength (W) MPa | 18.2 | 23.5 | 11.5 | 17.3 | 23.6 | 26.7 |
| (A) MPa | 17.7 | 21.9 | 14.8 | 15.9 | 22.1 | 26.1 |
| Elongation (W) % | 370 | 450 | 160 | 350 | 310 | 300 |
| (A) % | 360 | 430 | 310 | 340 | 320 | 310 |
| Tensile Set (W) % | 4 | 5 | 53 | 116 | 6 | 5 |
| (A) % | 4 | 4 | 105 | 110 | 6 | 5 |
| Trouser Tear (W) kN/m | 22.4 | 9.8 | 13.2 | 10.5 | 17.2 | 6.8 |

TABLE III-continued

| Experiment # | 16 | 17 | 18 | 19 | 20 | 21 |
|---|---|---|---|---|---|---|
| (A) kN/m | 21.2 | 8.9 | 13.8 | 13.8 | 18.5 | 8.7 |

EXAMPLE 7

A sample of a polychloroprene latex (Neoprene Latex 102) was co-coagulated with fibre. 1.45 g of fibre was suspended with agitation in an aqueous solution of 400 ml water, 4 g of alum, 20 g sodium chloride and 75 ml of the coagulant solution described in Example 3, which was maintained at about 60° C. 50 ml of the latex (45.6% solids) was slowly added to the agitated mixture resulting in the formation of a small particle size crumb of polymer plus fibre which was separated, washed with wash water until the wash water had a pH of about 7 and air dried. This was labelled as Experiment #22. A control coagulation was also undertaken with no fibre present as Experiment #23. The polymers were compounded (based on 100 parts of polymer) with 40 parts of carbon black, 4 parts of magnesium oxide and 5 parts of zinc oxide. Vulcanization was for 20 minutes at 160° C. The results are shown in Table IV.

TABLE IV

| Experiment # | | | 22 | 23 |
|---|---|---|---|---|
| Fibre content of polymer-fibre mixture phr | | | 3 | 0 |
| Compound Green Strength | | | | |
| Max. Stress | (W) | MPa | 6.2 | 4.4 |
| | (A) | MPa | 5.9 | — |
| Elongation | (W) | MPa | 105 | 155 |
| | (A) | MPa | 145 | — |
| Vulcanizate Properties | | | | |
| 100% Modulus | (W) | MPa | 16.4 | 15.9 |
| | (A) | MPa | 15.5 | 12.8 |
| Tensile Strength | (W) | MPa | 19.0 | 21.3 |
| | (A) | MPa | 18.6 | 18.9 |
| Elongation | (W) | % | 120 | 125 |
| | (A) | % | 110 | 130 |
| Tensile Set | (W) | % | 0 | 0 |
| | (A) | % | 0 | 0 |
| Trouser Tear | (W) | kN/m | 3.9 | 3.8 |
| | (A) | kN/m | 4.2 | 4.0 |

EXAMPLE 8

A fibre dispersion was prepared by dissolving 7.5 parts by weight of calcium chloride in 1500 parts by weight of water and adding, with mild agitation, 10.4 parts by weight of the fibre of Example 1. The dispersion was then subjected to agitation for 20 seconds in a lab mixer. A sample of butadiene-acrylonitrile polymer latex (about 34 weight percent of bound acrylonitrile) was prepared by adding 100 parts by weight of water to 38.5 parts by weight of a latex which contained about 10 parts by weight of polymer. The latex was then slowly added to the fibre dispersion with agitation. The polymer coagulated and physically covered the fibre. The product was separated from the aqueous phase, washed and recovered and yielded a polymer-fibre mixture which contained about 104 parts of fibre per 100 parts of polymer.

A sample (1 part by weight) of this polymer-fibre mixture was mixed on a rubber mill with 10 parts by weight of a butadiene-acrylonitrile polymer (about 34 weight percent of bound acrylonitrile) and after about 15 minutes of mixing yielded a product containing an essentially uniform dispersion of fibre in polymer (i.e. about 0.5 parts of fibre in about 10.5 parts of polymer), which shows that the concentrated (in fibre) polymer-fibre mixture can be used to provide an essentially uniform mixture of a lesser proportion of the fibre in polymer.

EXAMPLE 9

A fibre dispersion was prepared as in Example 8. A sample of styrene-butadiene polymer latex (about 23 weight percent of bound styrene) was prepared by adding 100 parts by weight of water to about 46 parts by weight of a latex which contained about 10 parts by weight of polymer. The latex was then slowly added to the fibre dispersion with agitation and the coagulated polymer-fibre mixture was separated, washed and dried to yield a polymer-fibre mixture which contained about 104 parts of fibre per 100 parts of polymer.

Samples of the polymer-fibre mixture were mixed, separately, on a rubber mill or in a lab sized internal mixer with further styrene-butadiene polymer or with polybutadiene and produced, after adequate mixing time, essentially uniform dispersions of fibre in polymer.

What is claimed is:

1. A process for the production of mixtures of polymer and fibrous material, said process comprising the steps of providing an agitated aqueous solution of coagulant for the polymer, said coagulant being selected from the group consisting of calcium chloride, sulfuric acid plus sodium chloride, sulphuric acid plus sodium chloride plus polyamine compound, alum, and alum plus sulphuric acid, adding an aqueous suspension of said fibrous material to the coagulant solution, adding said polymer in aqueous latex form to said coagulant solution and co-coagulating said polymer and fibrous material, and recovering and drying the mixture of polymer and fibrous material, said fibrous material being a polymeric paraphenylene terephthalamide aramid having an average length of from about 1 to about 5 mm and a BET surface area of greater than 1 m$^2$/g.

2. The process of claim 1 wherein the fibrous material is the aramid fibre used in the wet pulp form and having a BET surface area of from about 7 to about 12 m$^2$/g.

3. The process of claim 2 wherein the polymer in aqueous latex form is selected from synthetic rubbery polymers produced by emulsion polymerization and from other synthetic rubbery polymers in latex form.

4. The process of claim 3 wherein the polymer in aqueous latex form is selected from synthetic rubbery polymers produced by emulsion polymerization comprising styrene-butadiene polymers, butadiene-acrylonitrile polymers, carboxylated styrene-butadiene polymers, carboxylated butadiene-acrylonitrile polymers, polymers comprising chloroprene and polymers comprising acrylic monomers.

5. The process of claim 3 wherein the polymer in aqueous latex form is selected from other synthetic rubbery polymers in latex form comprising butyl rubber, halogenated butyl rubber, polybutadiene and ethylene-propylene-non-conjugated diene polymers.

6. The process of claim 2 wherein the amount of fibrous material in the mixture of polymer and fibrous material is from about 0.25 to about 20 parts by weight of fibrous material per 100 parts by weight of polymer.

7. The process of claim 2 wherein the amount of fibrous material in the mixture of polymer and fibrous material is from about 0.25 to about 100 parts by weight of fibrous material per 100 parts by weight of polymer.

8. The process of claim 2 wherein the aqueous latex contains from about 10 to about 45 weight percent of polymer based on the latex and the coagulation is undertaken with the coagulant solution maintained at a temperature of from about 25° to about 80° C.

9. The process of claim 2 wherein the co-coagulation is a continuous process in which the suspension of fibrous material is added continuously or intermittently to the coagulant solution while the latex is being added provided that part of the suspension of fibrous material is present in the coagulant solution before the addition of latex is initiated.

10. The process of claim 2 in which the polymer in aqueous latex form is selected from synthetic rubbery polymers produced by emulsion polymerization, the amount of fibrous material in the mixture of polymer and fibrous material is from about 0.25 to about 20 parts by weight per 100 parts by weight of polymer and the coagulation is undertaken with the coagulant solution maintained at a temperature of from about 25° to about 80° C.

11. The process of claim 10 wherein the polymer is selected from a styrene-butadiene polymer, an acrylonitrile-butadiene polymer and a polymer comprising chloroprene.

12. Polymer-fibrous material mixtures produced by the process of claim 1.

13. Polymer-fibrous material mixtures produced by the process of claim 10.

14. Polymer-fibrous material mixtures produced by the process of claim 11.

15. Vulcanizates produced by the steps comprising mixing a mixture of polymer and fibrous material with rubber compounding ingredients and vulcanization active agents, shaping the so-formed mixture and vulcanizing the shaped mixture by heating at an elevated temperature, wherein said mixture of polymer and fibrous material is produced by the process comprising the steps of providing an agitated aqueous solution of coagulant for the polymer, said coagulant being selected from the group consisting of calcium chloride, sulphuric acid plus sodium chloride, sulphuric acid plus sodium chloride plus polyamine compound, alum, and alum plus sulphuric acid, adding an aqueous suspension of said fibrous material to the coagulant solution, adding said polymer in aqueous latex form to said coagulant solution and co-coagulating said polymer and fibrous material, and recovering and drying the mixture of polymer and fibrous material, said fibrous material being a polymeric paraphenylene terephthalamide aramid having an average length of from about 1 to about 5 mm and a BET surface area of greater than 1 $m^2/g$.

16. The vulcanizate of claim 15 wherein the polymer in aqueous form is selected from synthetic rubbery polymers produced by emulsion polymerization, the amount of fibrous material in the mixture of polymer and fibrous material is from about 0.25 to about 20 parts by weight per 100 parts by weight of polymer and the rubber compounding ingredients include any one or more of filler, extender or plasticizer, antioxidant and antiozonant.

17. The vulcanizate of claim 16 in which the polymer is selected from a styrene-butadiene polymer, an acrylonitrile-butadiene polymer and a polymer comprising chloroprene.

18. The vulcanizate of claim 15 wherein the shaped mixture is vulcanized by heating at a temperature of from about 140° to about 250° C. for a time of from about 5 to about 120 minutes.

19. The vulcanizate of claim 15 wherein the mixture of polymer and fibrous material is mixed with one or more compatible polymers.

* * * * *